United States Patent
Umewaka

(10) Patent No.: US 7,369,629 B2
(45) Date of Patent: May 6, 2008

(54) FSK SIGNAL DEMODULATION CIRCUIT

(75) Inventor: Masahiro Umewaka, Ota (JP)

(73) Assignee: Sanyo Electric Co., Ltd., Moriguchi-shi, Osaka (JP)

( * ) Notice: Subject to any disclaimer, the term of this patent is extended or adjusted under 35 U.S.C. 154(b) by 673 days.

(21) Appl. No.: 10/933,129

(22) Filed: Sep. 2, 2004

(65) Prior Publication Data
US 2005/0084041 A1 Apr. 21, 2005

(30) Foreign Application Priority Data
Sep. 2, 2003 (JP) ............................. 2003-309519

(51) Int. Cl.
*H03D 3/00* (2006.01)
*H04L 27/22* (2006.01)

(52) U.S. Cl. ...................... 375/334; 375/303; 375/308; 375/329

(58) Field of Classification Search ................ 375/334, 375/303, 304, 305, 308, 309, 329, 286, 287, 375/283, 284, 328; 329/303
See application file for complete search history.

(56) References Cited

U.S. PATENT DOCUMENTS

| | | | | |
|---|---|---|---|---|
| 4,013,965 A | * | 3/1977 | Scharfe, Jr. ................. | 375/334 |
| 4,485,347 A | * | 11/1984 | Hirasawa et al. ........... | 329/303 |
| 4,499,425 A | * | 2/1985 | Maas ........................... | 329/303 |
| 5,483,193 A | * | 1/1996 | Kennedy et al. ............ | 329/300 |
| 5,684,837 A | * | 11/1997 | Chen ........................... | 375/334 |
| 5,783,967 A | * | 7/1998 | Takaya ........................ | 329/303 |
| 6,933,776 B2 | * | 8/2005 | Huang et al. ............... | 329/300 |

FOREIGN PATENT DOCUMENTS

JP 9-294143 11/1997

OTHER PUBLICATIONS

English Patent Abstract for 9-294143 from esp@cenet, published Nov. 11, 1997.

* cited by examiner

*Primary Examiner*—Chieh M. Fan
*Assistant Examiner*—Qutub Ghulamali
(74) *Attorney, Agent, or Firm*—Osha-Liang LLP

(57) ABSTRACT

A demodulation circuit for demodulating an FSK signal comprising a long bit having a long bit period and a short bit having a short bit period comprises a bit boundary detection section for detecting a bit boundary timing of each bit, and a bit determination section for making determination for each bit such that a particular bit is determined to be a long bit when a threshold time period has passed during a period from a bit boundary timing at a leading end of the bit to a bit boundary timing at a trailing end of the bit, and a particular bit is determined to be a short bit when the threshold time period has not passed during a period from a bit boundary timing at a leading end of the bit to a bit boundary timing at a trailing end of the bit.

8 Claims, 5 Drawing Sheets

FSK SIGNAL DEMODULATION CIRCUIT

CROSS-REFERENCE TO RELATED APPLICATION

The entire disclosure of Japanese Patent Application No. 2003-309519 including specification, claims, drawings and abstract is incorporated herein by reference in its entirety.

BACKGROUND OF THE INVENTION

1. Field of the Invention

The present invention relates to a demodulation circuit for demodulating an FSK signal which comprises a long bit pulse and a short bit pulse.

2. Description of the Related Art

An example of an FSK signal is described with reference to FIG. 5. As shown in FIG. 5, an FSK signal comprises a long bit, which has a long bit period, and a short bit, which has a short bit period. Note that a bit period is a combination of a period with a bit pulse and a period without a bit pulse. Each bit contains a single pulse having a certain length.

In the example of FIG. 1, a long bit contains a pulse having a long length, while a short bit contains a pulse having a short length. Either one of the long or short bits is set to a binary code "1", while the other is set to a binary code "0".

As described in Japanese Patent Laid-open Publication No. Hei 9-294143, for example, typical structures of a conventional FSK signal demodulation circuit may include one in which frequency variation is set correlated with voltage variation using a frequency discriminator so that bit determination, namely, determination as to whether 1 or 0, is made based on voltage variation, and another in which a duty ratio of each bit is determined using a clock signal in synchronism with an FSK signal in order to perform bit determination.

Although these demodulation circuits can exhibit preferable demodulation performance, they have a problem of a complicated circuit structure that is large in size.

SUMMARY OF THE INVENTION

The present invention attains simplification of a demodulation circuit to thereby reduce the size and weight of a system incorporating the demodulated circuit by employing the means described below.

That is, according to the present invention, there is provided, a demodulation circuit for demodulating an FSK signal which comprises a long bit having a long bit pulse length and a short bit having a short bit pulse length, the modulation circuit comprising a bit boundary detection section for detecting a bit boundary timing of each bit; and a bit determination section for making determination for each bit such that a relevant bit is determined to be a long bit when a threshold time period has passed during a period from a bit boundary timing at a leading end of the bit to a bit boundary timing at a trailing end of the bit, and a relevant bit is determined to be a short bit when a threshold time period has not passed during a period from a bit boundary timing at a leading end of the bit to a bit boundary timing at a trailing end of the bit.

In the demodulation circuit of the present invention, preferably, the bit determination section may include an excess period signal generation section for generating an excess period signal which remains effective during a period within each bit, namely the period from a point at which the threshold time period has passed to the bit boundary timing at the trailing end of the bit, and determines if the bit is a long bit or a short bit based on presence or absence of a period when the excess period signal associated with the bit remains effective.

In the demodulation circuit of the present invention, preferably the bit determination section may have a shift signal generating section for generating a shift signal corresponding to an excess period signal having an extended trailing end, and determines if each bit is a long bit or a short bit based on presence or absence of a period of time with the shift signal remaining effective, at a bit boundary timing at the trailing end of the bit.

As described above, according to the present invention, an FSK demodulation circuit having a relatively simple structure can be realized. As a result, the size and weight of a system which incorporates the demodulation circuit can be advantageously reduced, and additionally, the demodulation performance can be further improved.

BRIEF DESCRIPTION OF THE DRAWINGS

Preferred embodiment(s) of the present invention will be described in detail based on the following figures, wherein.

DESCRIPTION OF THE PREFERRED EMBODIMENTS

In the following, a preferred embodiment of the present invention is described with reference to the attached drawings.

Figure 1:
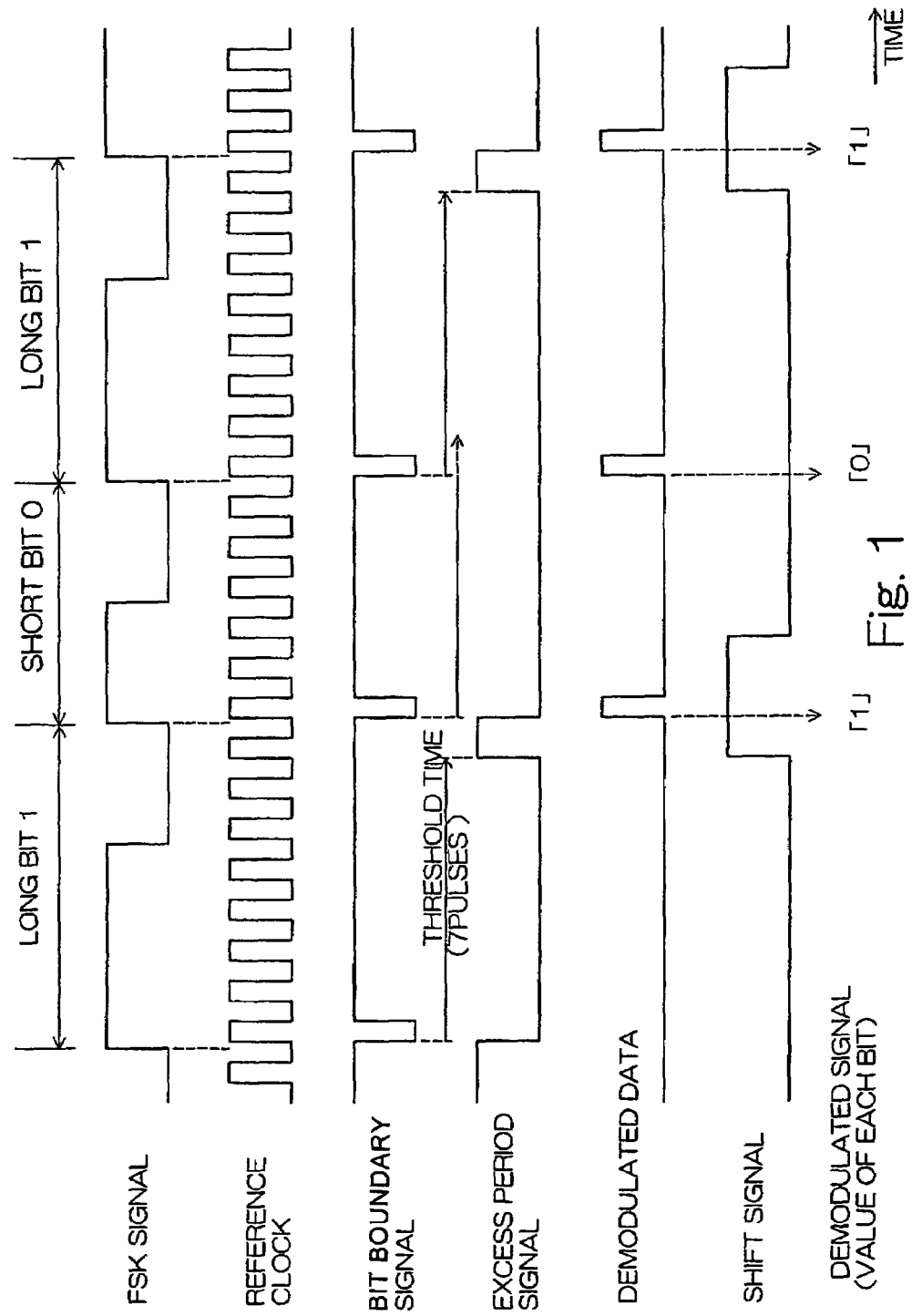
FIG. 1 is a timing chart for signals associated with respective sections of a demodulation circuit in an embodiment of the present invention.
Figure 2:
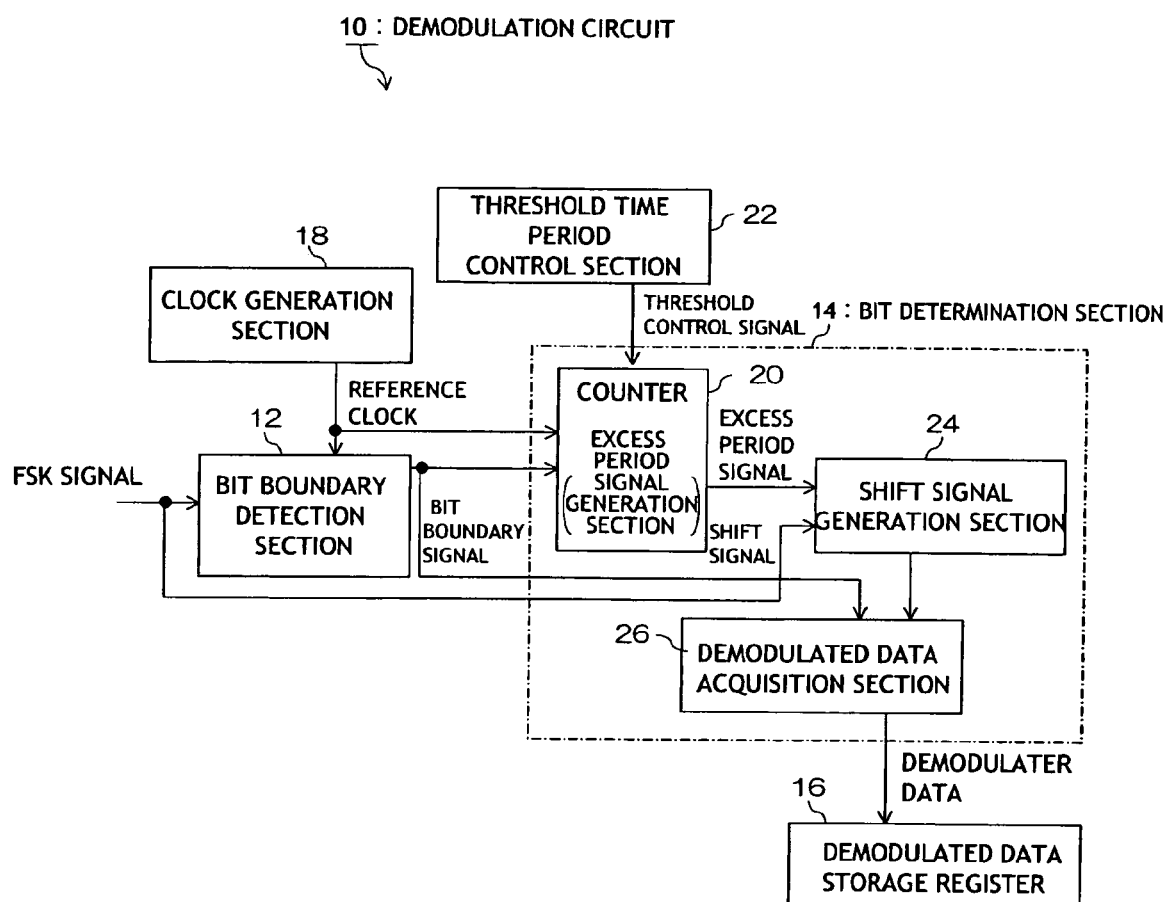
FIG. 2 is a diagram showing an example of a demodulation circuit in the embodiment of the present invention.
Figure 3:
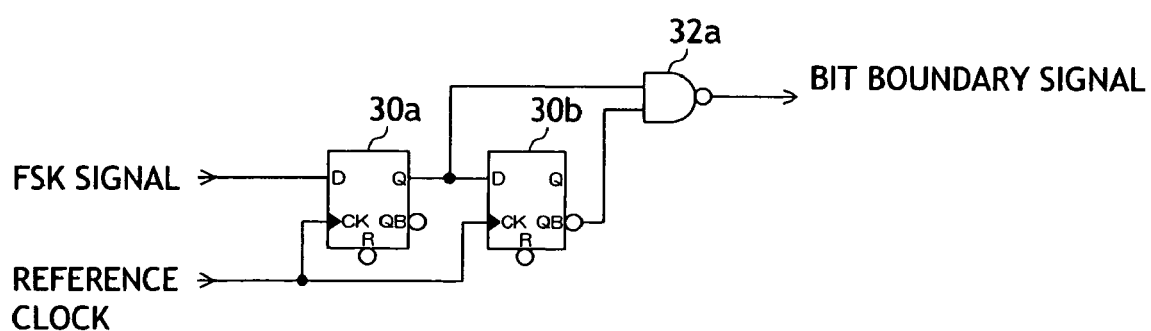
FIG. 3 is a diagram showing an example of a bit boundary detection section of a demodulation circuit in the embodiment of the present invention.
Figure 4:
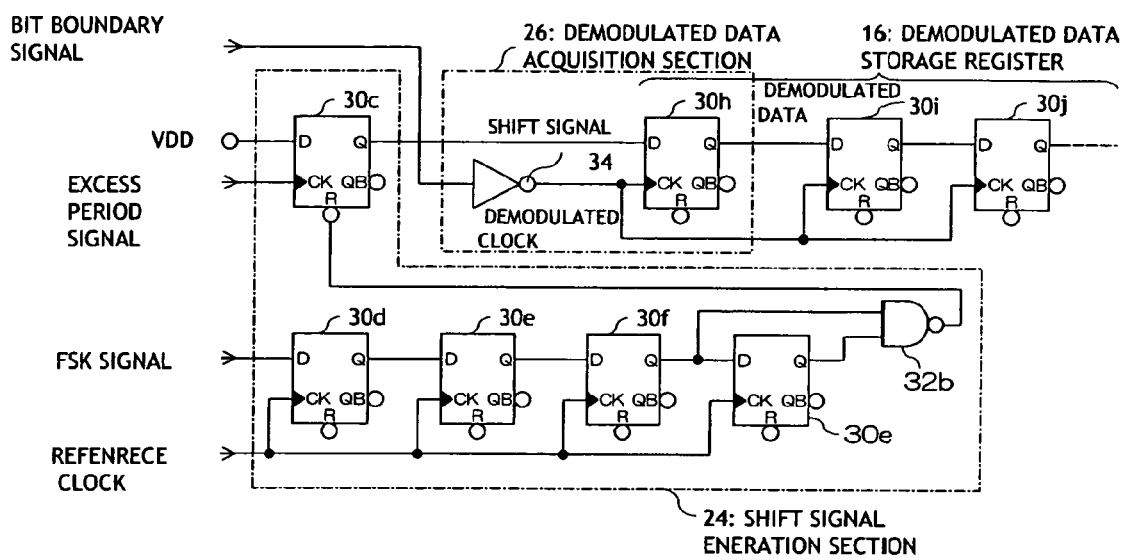
FIG. 4 is a diagram showing examples of a signal generating section, a demodulated data acquisition section, and a demodulated data storage register of a demodulation circuit in the embodiment of the present invention.
Figure 5:
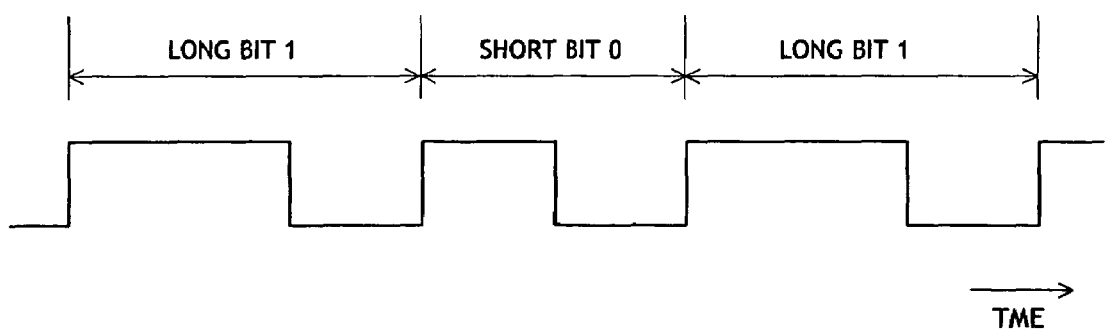
FIG. 5 is a diagram showing an example of an FSK signal.

FIG. 1 is a timing chart for the signals employed in a demodulation circuit 10 in the embodiment. FIG. 2 is a block diagram showing an example of a demodulation circuit 10. FIG. 3 is a diagram showing an example of a circuit structure of a bit boundary detection section 12. FIG. 4 is a diagram showing an example of a circuit structure of a shift signal generation section 24, a demodulated data acquisition section 26, and a demodulated data storage register 16.

The demodulation circuit 10 shown in FIG. 2 comprises a bit boundary detection section 12, a bit determination section 14, a demodulated data storage register 16, and a clock generation section 18 for generating a reference clock pulse signal (hereinafter referred to as a reference clock).

The bit boundary detection section 12 detects a bit boundary of an FSK signal, which, in the case of an FSK signal of FIG. 1, is at the rising edge of a pulse.

The bit boundary detection section 12, as shown in FIG. 3, for example, can comprise two-stage delay flip-flops 30a and 30b (a flip-flop of an edge trigger type, hereinafter simply referred to as a DFF), and a NAND gate 32a. The first-stage DFF 30a captures an FSK signal, which is fed to its D-terminal, in accordance with a reference clock having a predetermined cycle, which is supplied to the CK terminal.

A Q output from the DFF 30a is fed to the D-terminal of the second-stage DFF 30b, which also has a reference clock fed to its CK terminal. As a result, the second-stage DFF 30b acquires a signal which is delayed by an amount corresponding to a single reference clock pulse relative to the signal captured by the first-stage DFF 30a.

Thereafter, the NAND gate 32a obtains a NAND signal of a Q-output from the first-stage DFF 30a and a QB-output (an inverted output of a Q-output) from the second-stage DFF 30b to thereby produce a bit boundary signal shown in FIG. 1. A bit boundary signal is a signal which remains at a low (L) level during a period corresponding to one reference clock pulse closest to the rise of an FSK signal, and remains at a high (H) level for the rest of the relevant bit period. In this case, the time at which a bit boundary signal falls should be considered as a bit boundary in subsequent processing.

It should be noted that the bit boundary detection section 12 may be configured such that its operation, that is detection of a bit boundary, is made effective only when a predetermined condition is satisfied. For example, high and low levels of a reset signal for the DFFs 30a and 30b may be switched, or a gate (for example, an AND gate, or the like) for controlling an output signal of the NAND gate 32a may be provided downstream of the NAND gate 32a so that an output from the gate may be used as a bit boundary signal.

After detection of a bit boundary of an FSK signal by the bit boundary detection section 12, as described above, the bit determination section 14 performs bit determination using a result of the detection by the boundary detection section 12 and based on a time length between adjacent bit boundaries, that is, the length of a bit period. Specifically, in the example of FIG. 1, a threshold time period which is shorter than the bit period of a long bit and longer than that of a short bit is set, and a signal for use in determination as to whether a bit period is longer or shorter than the threshold time period is obtained.

The bit determination section 14 of FIG. 2, which is shown as an example of a circuit which performs the above-described processing, has a counter 20 (for example, an n-scale counter including a two or more stages of flip-flop), for counting the number of reference clock pulses.

The counter 20 is reset in response to a falling edge of a bit boundary signal (an L-level input), and begins outputting a predetermined signal (an excess period signal in FIG. 1) when, after being reset, the threshold pulse number (seven in FIG. 1) or more reference clocks have been counted. It should be noted that a threshold pulse number corresponds to a threshold time period. The signal output continues until the counter 20 is next reset (remaining at an H-level until the reset).

In the example of an FSK signal shown in FIG. 1, where a long bit corresponds to about eight reference clocks and a short bit corresponds to about six reference clocks, a threshold pulse number is set as seven. For a long bit, the counter 20 is reset in response to a falling edge of a bit boundary signal at the beginning of a bit period (an L-level), and begins signal output when the threshold pulse number of reference clocks have been counted (an H-level). The counter is reset in response to the subsequent falling edge of the bit boundary signal (an L-level). As a result, an excess period signal, which remains at an H level during a period from a point at which a threshold time period has passed to the end of the bit period, that is, the beginning of the subsequent bit period, is output.

For a short bit, on the other hand, no excess period signal is output since a falling edge of a bit boundary signal is input before completion of counting of the reference pulse number of reference clocks (remaining at an L-level). It should be noted that, in the above operation, the counter 20 provides an excess period signal generation section.

In the example of FIG. 2, a threshold time period control section 22 is provided as a means for variably setting a threshold time period. For example, the threshold time period control section 22 receives a command signal from an external device, for example, a computer or the like, and, based on the received signal, generates a parallel signal (for example, "010" comprising a plurality of bits for controlling a threshold count number for the counter 20.

The counter 20 has a circuit, for example, an OR gate, an AND gate, or the like, not shown, for changing, for example, the number of effective stages of flip-flops. When the circuit switches its outputs according to the values of the respective bits of the parallel signal, the number of effective stages of the flip-flops is varied, and a threshold count number of the counter 20 is also accordingly varied. This arrangement enables use of the same apparatus for FSK signals having a variety of pulse widths and duty ratios.

More specifically, in setting a different threshold time period, demodulated data resulting from a variety of threshold time periods are first obtained, and, thereafter, error bit rates relating to the respective threshold time periods are compared to one another in a circuit (not shown) subsequent to the demodulation circuit 10 so that a threshold time period (a threshold pulse number) with the lowest bit error rate can be selected and set.

Alternatively, selection of a threshold time period may be automatically applied upon detection of a bit error rate of demodulated data in excess of a predetermined threshold.

The bit determination section 14 of FIG. 2 performs bit determination, as described above. Specifically, the bit determination section 14 determines if each bit of an FSK signal is a long or short bit based on presence or absence of a period where an excess period signal remains at an H-level.

For this purpose, in the example of FIG. 2, a shift signal generation section 24 produces a shift signal by extending the trailing end of a pulse of an excess period signal by a predetermined period.

Where the trailing end of an excess period signal corresponds to the timing of a bit boundary between adjacent bit periods, at which a bit boundary signal falls, as shown in FIG. 1, use of a signal equivalent to an excess period signal having a pulse length prolonged by extending its trailing end can facilitate determination of presence or absence of a period where an excess period signal remains at an H-level, using a signal which is output at a bit boundary, such as a bit boundary signal or a demodulation clock, or an inverted output of a bit boundary signal.

In the example of FIG. 4, the shift signal generation section 24 has a DFF 30c. The DFF 30c has a constant voltage VDD (H level) fed to its D-terminal and an excess period signal fed to its CK-terminal, and outputs, via its Q-terminal, a signal which rises (becomes an H-level) at the point in time where a pulse of an excess period signal rises. The DFF 30c is reset after a lapse of a predetermined period of time after bit boundary. Consequently, an output from the Q-terminal of the DFF 30c serves as the shift signal described above.

In order to reset the DFF 30c, in the example of FIG. 4, a signal corresponding to an FSK signal delayed by a predetermined period, for example, a period corresponding to two pulses of a reference clock, is created using two DFFs 30d and 30e, and supplied to a circuit similar to that of FIG. 3, which comprises DFFs 30f and 30g and a NAND gate 32b, so that a signal having a pulse falling behind a bit boundary is created. This signal is equivalent to a bit boundary signal delayed by an amount corresponding to two reference clock pulses, and is used as a reset signal.

This, however, is only an example reset signal generation, and a reset signal for the DFF 30c, similar to the one described above, may alternatively be created by having a bit boundary signal of FIG. 1 pass through a plurality stages of cascaded DFFs to thereby be delayed.

It should be noted that a shift signal may be created without using a DFF 30c. Specifically, an OR output of a plurality of excess period signals delayed respectively by different amounts of periods may be obtained, and used as a shift signal.

After creation of a shift signal as described above, the demodulated data acquisition section 26 obtains demodulated data using the shift signal.

Specifically, in the example of FIG. 4, the demodulated data acquisition section 26 has a DFF 30h, which has a shift signal fed to its D-terminal and a demodulation clock, which is created by inverting a bit boundary signal in the inverter 34, fed to the CK terminal. In the case where the DFF 30h receives a shift signal at an H-level when it receives a demodulation clock, in other words, when the demodulation clock rises, the DFF 30h outputs a voltage of an H-level (corresponding to, "1").

Meanwhile, in the case where the DFF 30h receives a shift signal at an L-level when it receives a demodulation clock, in other words, when the demodulation clock falls, the DFF 30h outputs a voltage of an L-level (corresponding to, "0"). As a result, in the example of FIG. 1, demodulated data, or serial data such as "101", corresponding to the original FSK signal (serial data) can be produced.

The demodulated data is stored in a demodulated data storage register 16, which comprises, in the example of FIG. 4, the DFF 30h and a plurality of subsequent cascaded DFFs (30i, 30j . . . ). The respective DFFs (30i, 30j, . . . ) are also fed with a demodulation clock at their CK terminals.

The demodulated data stored in the demodulated data storage register 16 may be extracted later and used as desired in subsequent circuits.

As described above, in an embodiment of the present invention, an FSK demodulation circuit having a relatively simple circuit structure can be realized. The described embodiment, however, is merely an example of the present invention, and the present invention can be embodied using various other equivalent circuits to produce similar advantages.

It should be noted that the demodulation circuit described above can be incorporated into a radio communication device (a radio receiving device) which sends and receives a control signal for a vehicle-mounted system by means of radio communication. The radio communication device may include a vehicle-mounted communication device which sends and receives a signal for controlling locking and unlocking and/or opening and closing of a vehicle door; a vehicle-mounted communication device which sends and receives a signal for controlling turning a vehicle power mechanism (such as an engine and a motor), electric accessory, and so forth on or off; and a remote control device (such as a radio key device, a portable phone, and so forth) for communicating with such a vehicle-mounted communication device.

What is claimed is:

1. A demodulation circuit for demodulating an FSK signal which comprises a long bit having a long bit pulse length and a short bit having a short bit pulse length, the demodulation circuit comprising:

a bit boundary detection section for detecting a bit boundary timing of each bit; and a bit determination section for making determination for each bit such that a relevant bit is determined to be a long bit when a threshold time period has passed during a period from a bit boundary timing at a leading end of the bit to a bit boundary timing at a trailing end of the bit, and a relevant bit is determined to be a short bit when a threshold time period has not passed during a period from a bit boundary timing at a leading end of the bit to a bit boundary timing at a trailing end of the bit, wherein the bit determination section includes an excess period signal generation section for generating an excess period signal which remains effective during a period within each bit, namely the period from a point at which the threshold time period has passed to the bit boundary timing at the trailing end of the bit, and determines if the bit is a long bit or a short bit based on presence or absence of a period when the excess period signal associated with the bit remains effective, and the excess period signal generation section includes a counter for counting a number of pulses of a clock signal with a reference timing at the bit boundary timing at the leading end of the bit, and a generator which generates, as the excess period signal, a signal which is effective in a period from a timing when a counting of a predetermined number of counts is completed to the bit boundary timing at the trailing end of the bit.

2. The demodulation circuit according to claim 1, wherein the bit determination section has a shift signal generating section for generating a shift signal corresponding to the excess period signal having an extended trailing end, and determines if each bit is a long bit or a short bit based on presence or absence of a period of time with the shift signal remaining effective, at a bit boundary timing at the trailing end of the bit.

3. The demodulation circuit according to claim 2, wherein the shift signal generating section includes a plurality of flip-flop circuits in serial connection and a logical operation circuit, and generates the shift signal based on the excess period signal and a signal obtained through a logical operation using a signal output from a last-stage flip-flop among the plurality of flip-flops and a signal output from a flip-flop immediately before the last-stage flip-flop.

4. The demodulation circuit according to claim 1, further comprising a means for variably setting the threshold time period according to a predetermined command input.

5. The demodulation circuit according to claim 1, wherein the FSK signal is a control signal for a vehicle-mounted system.

6. The demodulation circuit according to claim 1, wherein the bit boundary detection section includes a plurality of flip-flop circuits in serial connection and a logical operation circuit, and outputs a signal obtained though a logical operation using a signal output from a last-stage flip-flop among the plurality of flip-flops and a signal output from a flip-flop immediately before the last-stage flip-flop.

7. The demodulation circuit according to claim 1, wherein the counter includes a plurality of flip-flop circuits and a selection circuit for selecting at least one flip-flop circuit to be effectively operated from among the plurality of flip-flop circuits, in which a count number of the counter is changed according to selection by the selection circuit.

8. The demodulation circuit according to claim 7, further comprising a selection circuit control section for controlling the selection circuit to thereby change the count number of the counter, wherein the demodulation circuit variably sets the count number of the counter in accordance with a predetermined command input to thereby variably set the threshold time period.

* * * * *